Patented July 10, 1923.

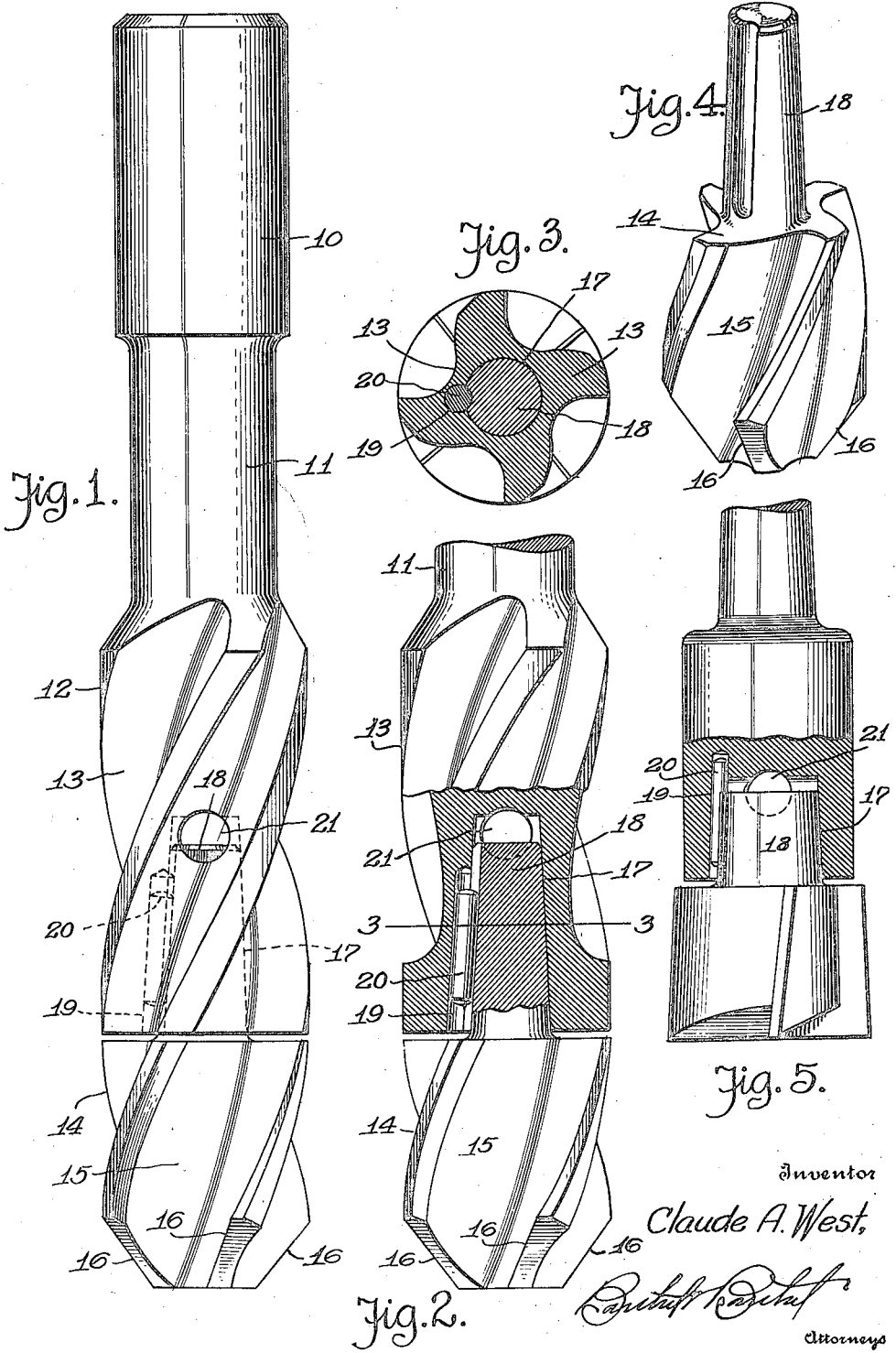

1,461,548

UNITED STATES PATENT OFFICE.

CLAUDE A. WEST, OF DETROIT, MICHIGAN.

METAL-WORKING TOOL.

Application filed May 5, 1921. Serial No. 466,870.

*To all whom it may concern:*

Be it known that I, CLAUDE A. WEST, a citizen of the United States of America, residing at Detroit, in the county of Wayne and State of Michigan, have invented certain new and useful Improvements in Metal-Working Tools, of which the following is a specification, reference being had therein to the accompanying drawings.

This invention relates to metal working tools and more particularly to boring tools specially designed for very heavy work.

It is an object of the invention to provide a very rigid driving connection between the tool shank and a socket portion to receive the shank, which driving connection is such as to permit ready removal of the shank from the socket and yet provide a drive which will withstand equally with any other part of the tool severe strains to which the tool is subjected, and which connection is not liable to become loosened during use, causing the shank to be twisted or broken.

A further object is to provide a driving connection including a key wherein twisting strains upon the shank will not tend to loosen the key but will cause the shank to be more firmly seated in its socket and the construction of which connection is such as to facilitate and cheapen manufacture.

It is also an object of the tool construction to effect a great saving in cost of material by providing a detachable cutting head or end of suitable high speed steel to withstand the cutting strains and a body portion forming a continuation of the head or end portion and which may as well be formed of a less costly steel, thus greatly reducing the cost of manufacture and maintenance.

A further object is to provide certain other new and useful features, all as hereinafter more fully described.

With the above and other ends in view, the invention consists in the matters hereinafter set forth and more particularly pointed out in the appended claims, reference being had to the accompanying drawing, in which—

Figure 1 is a side elevation of a tool illustrative of the invention;

Fig. 2 is a similar view of the lower portion of the tool with portions broken away and in section to more clearly show the construction;

Fig. 3 is a transverse section substantially upon the line 3—3 of Fig. 2;

Fig. 4 is a perspective view of the detachable end or head portion of the tool; and Fig. 5 is a sectional side elevation of a tool embodying the invention and illustrating a modified construction.

Boring or other metal cutting tools designed for heavy work must necessarily be made of the best tool steel which is very expensive and these tools are often broken in use and wear away and must often be sharpened to keep a proper cutting edge. A boring tool of the class illustrated in Fig. 1 usually has a long heavy shank and a body portion of considerable length which is fluted for the purpose of carrying away the chips in process of boring. The usual practice has been to make the entire tool from a single piece of metal and thus a large piece of tool steel is required in the manufacture and this makes the tool very expensive. If such a tool is broken or chipped and thus rendered worthless, the entire tool must be discarded.

In the construction shown, the tool is made with a detachable cutting end or head which forms a continuation of the body but it is not necessary to make the body portion of the same expensive tool steel as the cutting head or end. A difficulty which rises in such a construction is the securing of a head or end portion to the body. Such connection must be very strong and rigid as it is required to take the full twisting strain of driving the tool and further, the size of this connection is limited by the diameter of the body of the tool. Also the head and body must be rigidly held together and yet the head should be quickly detachable from the body so that it may be taken off at any time and replaced by another. Further, the head forms a continuation of the body and where the body is spirally fluted, as shown in Fig. 1 of the drawing, the corresponding flutes on the head must accurately align with those on the body and the body and head held firmly against relative turning, the parts being so constructed that it will be impossible to connect the head to the body in any other than its proper aligning relation.

In Fig. 1 of the drawing is illustrated a large boring tool for heavy work which is provided with the usual driving shank 10 with the neck portion 11, which is of slightly reduced diameter, and the body portion of the tool 12 which is provided with the usual spirally arranged flutes 13 extending from the neck portion to the end of the tool.

In the construction illustrated, the tool is provided with a detachable cutting end or head 14 formed with spiral flutes 15 which correspond with the flutes 13 of the body and form a continuation thereof. The end of the tool or head is formed in the usual manner with the beveled cutting edges 16 which may be ground to keep these edges sharp. A suitable connection, for detachably securing the head to the body, is provided by forming a tapered socket 17 in the body extending axially inward from its lower end, and providing a shank 18 on the head which shank is tapered to fit the tapered socket. To form the driving connection between the body and head so that the shank will not turn in its socket, a hole 19 is bored inwardly from the end of the body parallel with the side of the socket and the longitudinal axis of this hole lies outside of a plane tangent to the circumference of the socket so that more than half of the diameter of the hole 19 will lie outside of the socket but will cut through at one side into this socket. A round pin 20 is then driven into this hole, endwise, and is firmly held therein by reason of more than one-half of the hole being cut in the body, and only a portion of one side of the pin will project into the socket when it is in place in the hole. This pin thus forms a driving key, the shank 18 being formed with a groove to fit the rounded side of the pin which projects into the socket.

A very strong and rigid driving connection is thus provided as the shank and its socket are tapered to provide a close fit and as the pin 20, which forms the key, provides a rounded portion projecting into the socket and closely fitting within the groove or key way in the shank, there can be no play or lost motion permitting the shank to turn within the socket and the twisting strain of driving the head will tend to more firmly seat the shank in its socket because of the rounded inwardly projecting side of the key or pin 20. Further, there is no tendency of the key to become loose in its seat for the reason that it is perfectly round in cross section and is driven into a round hole. Therefore, any lateral strain on this key will not tend to tilt it in its seat but will rather only tend to more firmly engage it with its seat. In other words, twisting strain which tends to turn the shank 18 in its socket will not shear the key off or loosen it nor will it loosen the shank 18 in its socket but there will be a wedging action by reason of the rounded side of the key projecting into the socket, which wedging action forces the key to its seat and at the same time more firmly seats the shank against the side of the socket. Further, the round key provides greater area in the direction of the shearing action of turning the shank within the socket, and as there is no tendency for the key to tilt in its seat, this shearing action on the key is nil and the latter will withstand a greater strain than the body of the tool so that the tool itself will be broken before the connection between the head and the body will give way. As the key 20 is round in cross section, a seat for it is readily provided by boring lengthwise of the socket inwardly from the end of the body and by the offsetting of this hole slightly, the key may be driven endwise into the hole and will thus be held in place to form the proper driving connection whenever the shank is slipped endwise into the socket. The shank may be readily disengaged at any time and the head removed by placing any suitable drift pin or other tool in a transverse hole 21 which is provided in the body at the end of the socket 17, and driving this tool into the hole in engagement with the end of the shank 18, thus forcing the shank outwardly and detaching the head.

A quick detachable cutting end or head may therefore be provided for any cutting tool and this cutting head may be made of high speed steel while the remainder of the body and the driving shank portions may be formed of ordinary steel, thus greatly reducing the cost of such tools. By reason of the tapered shank on the head engaging the tapered socket in the end of the body, together with the round key, a comparatively short shank for connecting the head portion to the body may be provided and will firmly hold the parts against the severe twisting strains to which they are subjected.

Obviously, the invention may be applied to other than boring tools such as shown in Figs. 1 and 2, and may be applied as illustrated in Fig. 5 to an end milling or facing tool, the cutter head being connected to the shank for carrying it, by means of a tapered shank on the head engaging a tapered socket, together with the round key forming the driving connection.

Other changes in the construction and arrangement of parts may be made within the scope of the appended claims without departing from the spirit of the invention, and I do not, therefore, limit myself to the particular construction shown.

What I claim is:—

1. A drive for metal working tools comprising in combination, a member provided with a tapered circular socket and with a bore extending longitudinally of the socket, the bore cutting through one side of the socket with a major portion of the bore circumference lying outside the socket circumference, a member having a tapered shank to fit said socket and provided with a longitudinal groove, and a key of circular form in cross-section fitting within the bore and held therein by engagement therewith with a side portion thereof projecting into said socket to engage and fit within the groove in the shank.

2. In a metal working tool, a drive comprising in combination, a member formed with a socket extending longitudinally inward from one end thereof, said socket being circular in cross-section and tapered longitudinally, said member being also formed with a bore extending longitudinally of said socket inward from said end of said member with one side of said bore cutting through the wall of said socket and the longitudinal axis of said bore located outside the circumference of said socket and extending parallel with the surface of the wall of said socket, and a member having a shank which is tapered to fit within said socket and is formed with a longitudinal groove arc shaped in cross-section to receive and fit the rounded side of said key projecting into said socket.

3. A drill comprising a body formed with spiral flutes and a tapered circular socket and bore extending inward from one end, said bore extending longitudinally of said socket with the axis of the bore parallel with the adjacent tapered side of the socket and outside the circumference of said socket and with said bore cutting through the wall of the socket, a cylindrical key in said bore, a head formed with spiral flutes forming a continuation of the flutes on the body, and a tapered shank on said head to fit into said socket and formed with a longitudinal groove to receive the side of said key projecting into said socket, said socket and bore being within a circle described above the axis of the body and touching the innermost portions of said flutes in cross-section of the body.

In testimony whereof I affix my signature in presence of two witnesses.

CLAUDE A. WEST.

Witnesses:
LEWIS E. FLANDERS,
ANNA M. DORR.